United States Patent [19]
Loisy et al.

[11] Patent Number: 4,519,208
[45] Date of Patent: May 28, 1985

[54] PROPULSION ENGINE, PARTICULARLY FOR SUPERSONIC AIRCRAFT

[75] Inventors: Jean M. Loisy, Saint Fargeau-Ponthierry; Claude C. F. Menioux, Nogent sur Marne, both of France

[73] Assignee: S.N.E.C.M.A., Paris, France

[21] Appl. No.: 420,914

[22] Filed: Sep. 21, 1982

[30] Foreign Application Priority Data

Sep. 25, 1981 [FR] France .................... 81 18070

[51] Int. Cl.$^3$ .............................................. F02K 3/06
[52] U.S. Cl. ........................................ 60/262; 60/263; 60/271
[58] Field of Search .............. 60/262, 263, 224, 244, 60/230, 232, 242, 271; 239/265.39

[56] References Cited

U.S. PATENT DOCUMENTS

| | | | |
|---|---|---|---|
| 2,465,099 | 3/1949 | Johnson | 60/224 |
| 2,677,932 | 5/1954 | Forsling | 60/224 |
| 3,154,915 | 11/1964 | Eichholtz | 60/263 |
| 3,252,282 | 5/1966 | Grieb | 60/263 |
| 3,296,800 | 1/1967 | Keenan et al. | 60/262 |
| 3,368,352 | 2/1968 | Hewson | 60/263 |
| 3,677,012 | 7/1972 | Batscha | 60/263 X |
| 3,897,907 | 8/1975 | Colley | 239/265.39 |
| 3,955,782 | 5/1976 | Calder et al. | 60/262 X |
| 4,049,198 | 9/1977 | Maurer | 239/265.39 |
| 4,183,211 | 1/1980 | Menioux | 60/244 |

FOREIGN PATENT DOCUMENTS

| | | | |
|---|---|---|---|
| 943203 | 3/1949 | France . | |
| 1288767 | 2/1962 | France . | |
| 2041560 | 1/1971 | France . | |
| 2183531 | 12/1973 | France . | |
| 2270450 | 1/1976 | France | 60/262 |
| 2392239 | 12/1978 | France . | |
| 594201 | 11/1947 | United Kingdom | 60/224 |
| 1211081 | 11/1970 | United Kingdom . | |

Primary Examiner—Carlton R. Croyle
Assistant Examiner—Jeffrey A. Simenauer
Attorney, Agent, or Firm—Oblon, Fisher, Spivak, McClelland & Maier

[57] ABSTRACT

The invention relates to a propulsion engine, particularly for supersonic aircraft. An internal propulsion system comprises an envelope displaying a tapered center portion, around which is coaxially mounted an external propulsion system which lacks a separate compressor. According to the invention, mechanisms are provided to divert toward the combustion chamber of the external propulsion system an adjustable fraction of the compressed air arriving from the last compressor stage of the internal propulsion system. A blower which is driven by the external turbine exhausts in parallel with the latter into an annular conduit which emerges between the internal nozzle and external nozzle and an exhaust nozzle, all of these nozzles being of variable geometry. The purpose of the invention is to improve variable cycle propulsion engines for second-generation supersonic aircraft.

12 Claims, 8 Drawing Figures

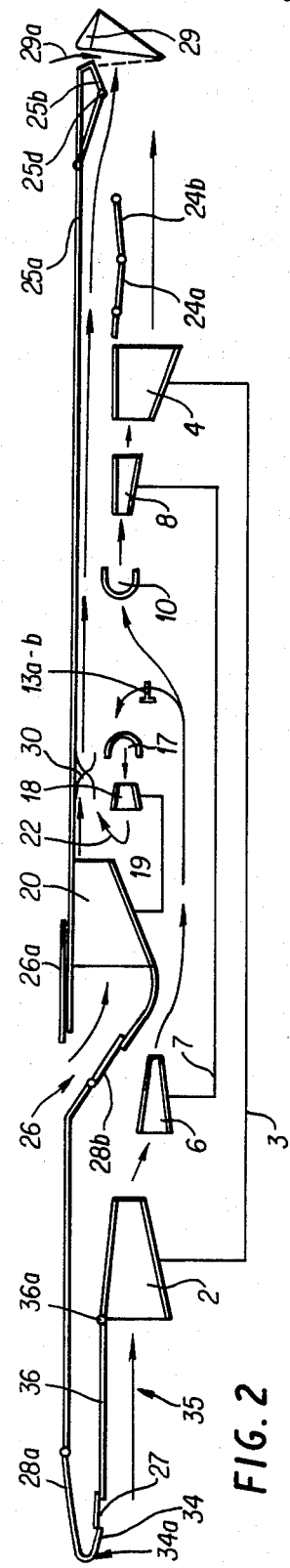
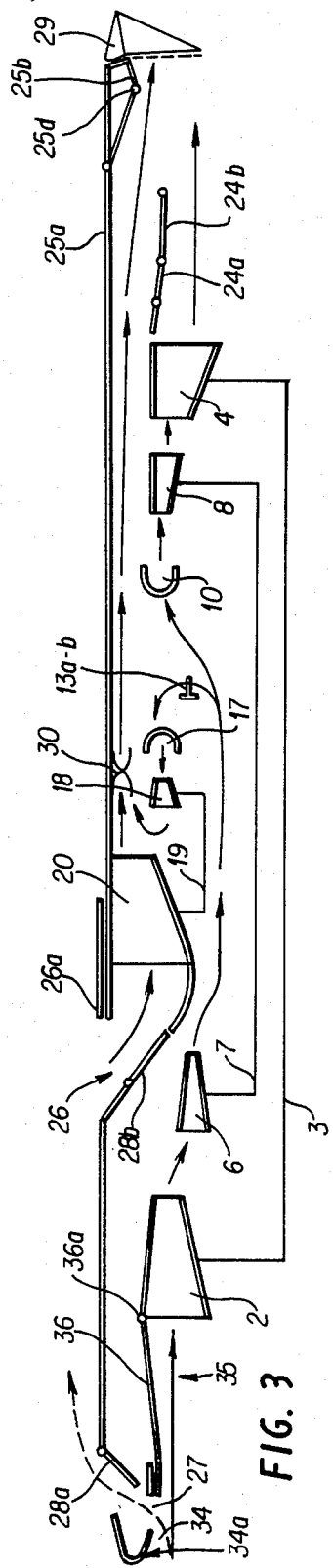
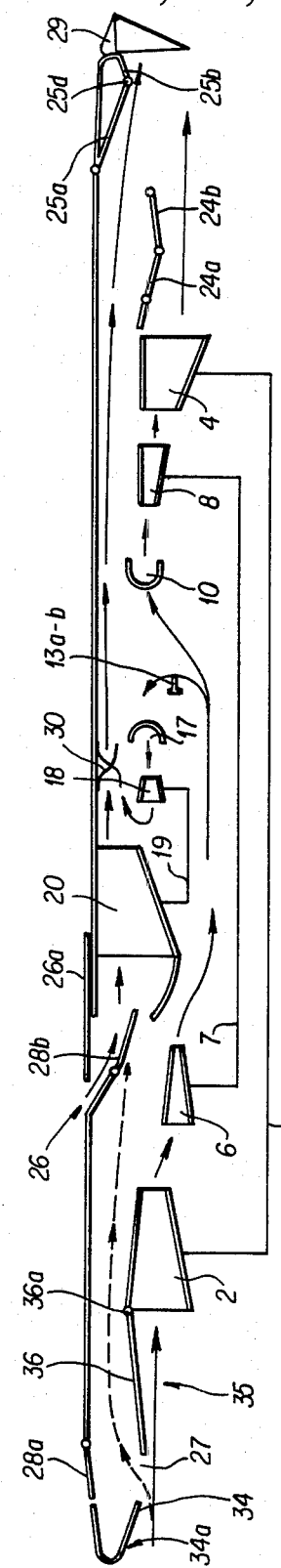

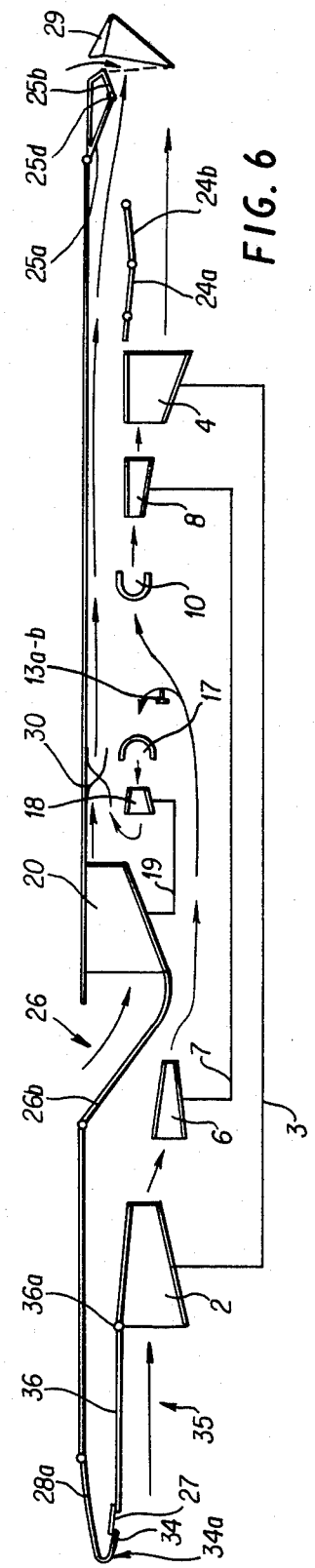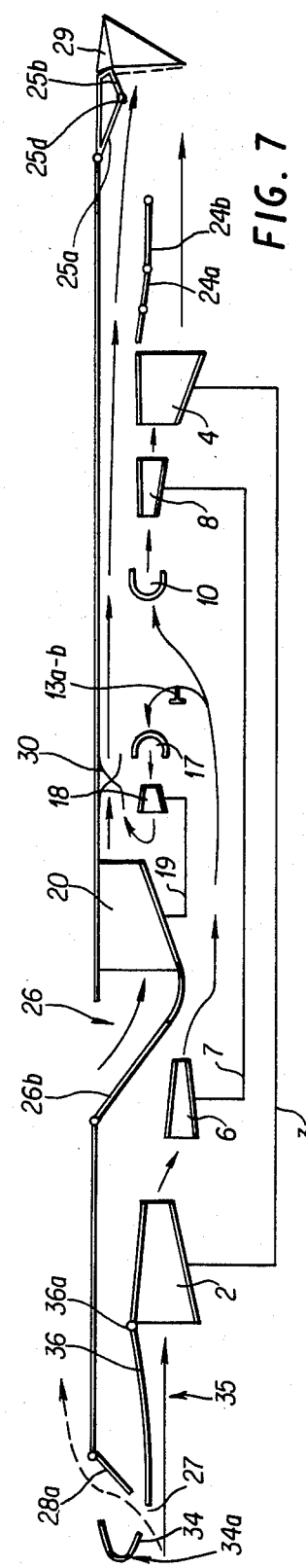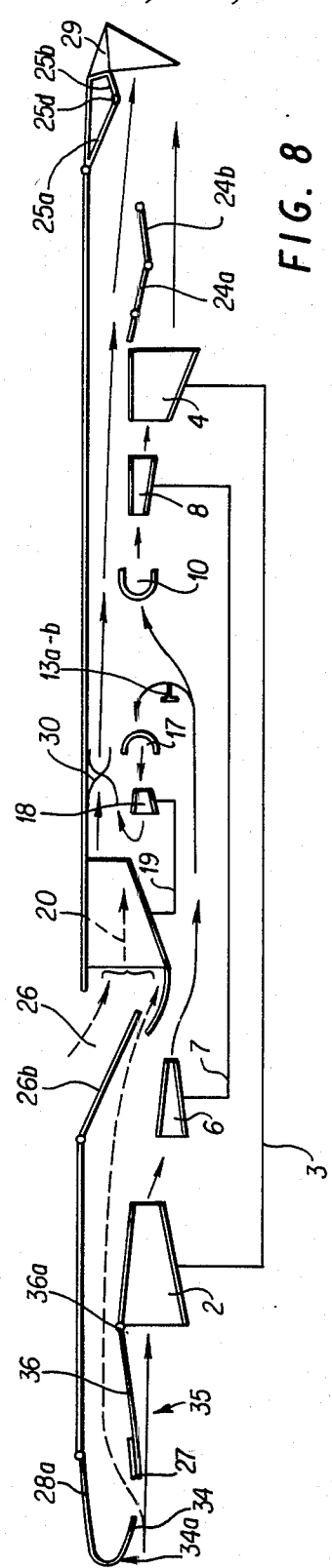

PROPULSION ENGINE, PARTICULARLY FOR SUPERSONIC AIRCRAFT

BACKGROUND OF THE INVENTION

1. Field of the Invention

The present invention relates to a propulsion engine of the improved gas turbine engine type which is particularly adapted for use in supersonic aircraft.

2. Description of the Prior Art

The so-called "first generation" propulsion engines developed for supersonic aircraft have not been found to be completely satisfactory. Indeed, in many cases, the propulsive thrust does not—at least at certain speeds—fully occupy the nozzle section, which has been oversized for this reason.

In addition, there exists a certain incompatibility between the obtaining of a high thrust per unit of power at supersonic cruising speed, involving the highest possible exhaust ejection speeds, on the one hand, and the reduction of ejection speed at take-off which is desirable for noise limitation, on the other hand. Indeed, in order to provide sufficient thrust at take-off at such reduced ejection speeds, the propulsion system requires a high intake flow and consequently a large intake section. Since the central diameter of the nacelle increases substantially in proportion to the engine intake section, an increase in the intake section leads to an increased central diameter and thus increased drag of the nacelle. As a result, there is a reduction of the "useful thrust" (engine thrust less drag of the corresponding nacelle).

As a proposed solution to this problem, French Patent No. 2,392,239 disclosed a propulsion system for supersonic aircraft comprising an external turbojet and an internal turbojet positioned concentrically within a single engine pod and capable of operating independently of each other, wherein the external turbojet extends axially around a tapered portion of the envelope of the internal turbojet, the tapered portion being located between its last compression stage and its combustion chamber. This arrangement enables two turbojets—one internal and the other external—to be grouped in the same nacelle with a relatively small central diameter which is adequate to accommodate the internal turbojet, since the external turbojet is somewhat "sunken" into the tapered portion of the internal turbojet envelope. During take-off, however, the thrusts of the two turbojets combine, so that their ejection speeds can be reduced to limit the amount of noise produced. However, like all other propulsion engines comprising two turbojets operating in parallel, and/or serially, this prior art propulsion system is relatively heavy, insofar as each of its two turbojets—external and internal—separately includes at least a compressor assembly, a combustion chamber and at least one turbine stage.

SUMMARY OF THE INVENTION

The present invention has as an object an improvement of the propulsion system for supersonic aircraft disclosed in said French Patent. More specifically, this improvement provides for a significant reduction of the mass of the propulsion system.

In common terminology, the word "turbojet"—which is encompassed within the broader category of "gas turbine engine—applies to a propulsion engine including, in front of the combustion chamber, at least one compressor, which is driven by at least one turbine powered by gases that have been heated in the combustion chamber. Prior to entering this combustion chamber, the gases have passed through the above-mentioned compressor, which is an integral part of the gas turbine engine. In order to avoid confusion of terms, the description which follows shall use "propulsion system" to designate a system associated with a nozzle for ejection of gases either directly into the atmosphere or into another associated nozzle, said propulsion system comprising a combustion chamber which supplies at least one turbine with heated gases and either includes or does not include at least one compressor or one blower.

The propulsion engine according to this invention, like the invention disclosed in the French Patent cited above, provides for grouping, within a single, relatively compact nacelle, two propulsion systems as defined in the preceding paragraph. The propulsion engine according to the invention additionally includes mechanisms to divert an adjustable fraction of the compressed air from the last compressor stage of the internal propulsion system directly toward the combustion chamber of the external propulsion system. According to the invention, the combustion gases then pass through an external turbine, and the blower driven by said external turbine, in parallel with the latter, exhausts into one end of an external annular conduit, the other end of which emerges in an external nozzle of variable geometry which surrounds and extends the nozzle of the internal propulsion system, the latter nozzle preferably also having variable geometry.

According to the invention, the two propulsion systems simultaneously provide thrust under certain operating conditions, particularly at take-off, with moderate gas ejection speeds and therefore relatively low noise levels, while under other operating conditions, particularly at cruising speed, one of the propulsion systems is shut off and the other propulsion system continues to operate, producing high thrust through high gas ejection speed.

The improved low mass of the propulsion engine according to the invention substantially results from the fact that its external propulsion system does not comprise specific compression stages but is directly supplied with compressed air from the last compressor stage of the internal propulsion system.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views, and wherein:

FIGS. 2 through 4 are schematic drawings of the upper half of the embodiment illustrated in FIG. 1, these schematic drawings illustrating the operation of this embodiment at the various flight speeds of the supersonic aircraft;

FIGS. 6 through 8 are, respectively, schematic drawings similar to those of FIGS. 2, 3, 4 and correspond to this second embodiment.

DETAILED DESCRIPTION OF THE PREFERRED EMBODIMENTS

Figure 1:
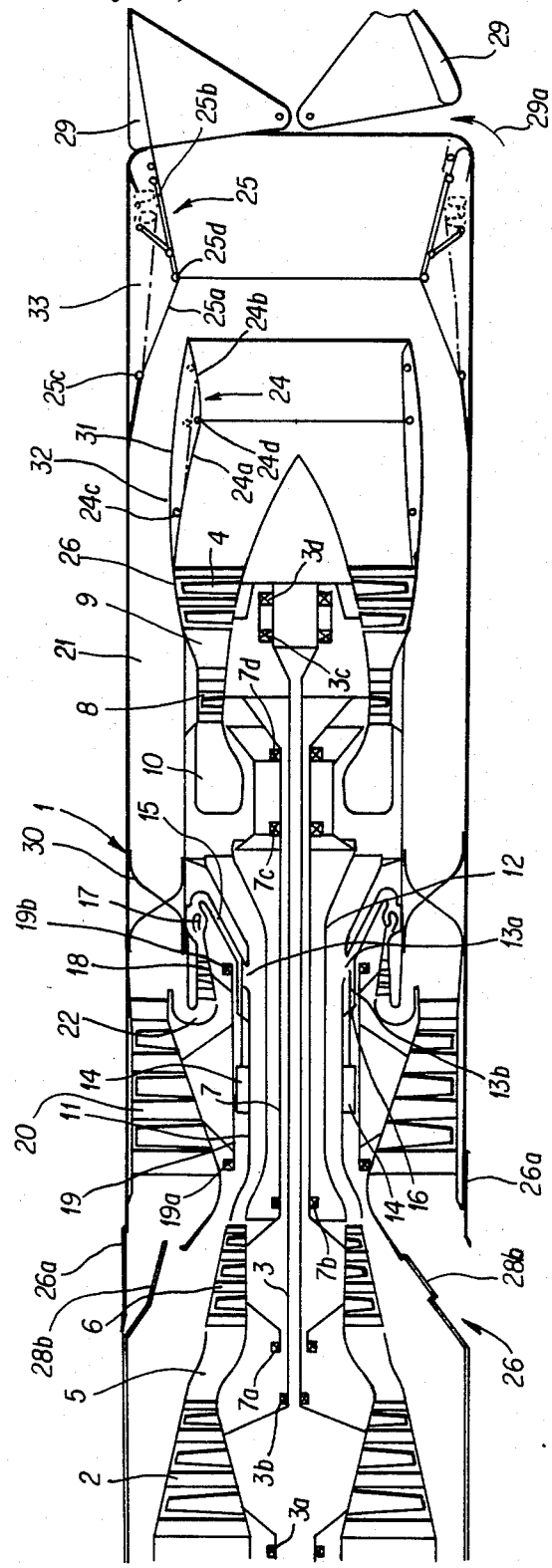
FIG. 1 is a schematic drawing of one embodiment of the invention, showing a cross-section through an axial plane. The working parts seen above the horizontal geometric axis are in their positions at supersonic cruising speed and the working parts below said horizontal axis are in their positions at take-off.

In FIG. 1, which shows a two-spool embodiment, the external envelope 1 of the engine pod is generally cylindrical and, in a preferred variation, may constitute the hull of the nacelle in which an external propulsion system and an internal propulsion system are set concentrically to each other. The internal propulsion system comprises, near the front of the nacelle (at the left in FIG. 1), a low pressure compressor 2, which is rotated by a shaft 3 concentric to the cylindrical envelope 1. The shaft 3 is driven by a low pressure turbine 4 and transmits the power supplied by the turbine to the compressor 2. The low-pressure spool composed of the compressor 2, the shaft 3 and the low pressure turbine 4 rotates freely in bearings 3a, 3b, 3c and 3d, the stationary parts of which (not shown) are fixed to the envelope 1, or to integral elements thereof, through supporting parts (also not shown). The exhaust of the low pressure compressor 2 is connected, through a fixed annular conduit 5, to the intake port of a high pressure compressor 6. The rotor of the latter is driven by a hollow shaft 7 which is concentric and external to shaft 3. Shaft 7 is rotated by a high pressure turbine 8 and transmits the power provided by said turbine to compressor 6. The high pressure spool, composed of the high pressure compressor 6, the shaft 7 and the high pressure turbine 8, rotates freely in bearings 7a, 7b, 7c and 7d, the stationary parts (not shown) of which are fixed to the envelope 1 or to integral parts thereof, through supporting parts (also not shown). The exhaust of the high pressure turbine 8 is connected by a fixed conduit 9 to the intake port of the low pressure turbine 4, or is directly in front of the latter.

The high pressure compressor 6 exhaust is connected to the intake of a combustion chamber 10, which can be annular, through a conduit which is also annular and which is formed by the space between two envelopes 11 and 12, concentric to shafts 3 and 7. These two envelopes, and specifically envelope 11 which separates the previously described internal propulsion system from the external propulsion system, comprise, in the manner disclosed in the aforesaid French Patent, a tapered part which is positioned between the exhaust of the high pressure compressor 6 and the intake of combustion chamber 10.

According to the present invention, passages, and more specifically ports 13a, are located in the tapered wall of envelope 11 of the internal propulsion system, preferably toward the rear of the tapered wall, and a cylindrical coupling 13b is positioned on said cylindrical envelope 11 in such a way that it can move freely in an axial direction relative to ports 13a. In this embodiment, at least one jack 14, for instance a screw jack or hydraulic jack, is coupled to the front end of the coupling 13b in order to provide for continuous modification of its position relative to ports 13a between a completely open position (shown on the lower half of FIG. 1) and a completely closed position (shown on the upper half of FIG. 1).

The external propulsion system, which is lodged around the tapered part of the envelope 11 of the internal propulsion system, more particularly comprises a conduit with an annular section, which diverges toward the rear 15. It can instead consist of a multiplicity of conduits, for instance cylindrical conduits, positioned radially outside of the internal propulsion system and toward the back of the engine pod envelope 1. The conduits connect a cylindrical cover 16, which envelops and seals the area of envelope 11 where ports 13a are located, with an annular combustion chamber 17 or with several combustion chambers distributed evenly around envelope 11.

Combustion chamber 17 supplies the intake port of an external turbine 18, transmitting the acquired power through a hollow shaft 19 to a blower 20 mounted on the hollow shaft 19. The hollow shaft 19 which is concentric to envelope 11 and to cover 16, rotates freely in bearings 19a, 19b, the stationary parts (not shown) of which are fixed to envelope 1, or to integral parts thereof through supporting parts (also not shown). The stator of blower 20 is directly supported by the external envelope 1 of the engine pod. The exhaust of blower 20 emerges into one end of an annular conduit 21 which is externally defined by the external envelope of engine pod 1 and which extends toward the rear, substantially up to the level of the internal turbine 4. The exhaust of the external turbine 18 is connected, for instance by an elbow conduit 22, to the same end of the external annular conduit 21 into which the exhaust of blower 20 emerges so that there is a confluence of these gases.

Thus, the propulsion engine according to the invention, which has just been described, comprises an internal propulsion system composed of elements 2, 4, 6, 8 and 10 and associated to the corresponding ejection nozzle, which shall be described below, and an external propulsion system, composed of elements 13a, 13b, 15, 17, 18, 19, 20 and 22 and also associated to an ejection nozzle, to be described below. It should be emphasized that the external propulsion system does not include a compressor. Thus, one of the essential features of the invention lies in the fact that there is provided, in front of a single compression system (in the embodiment described, composed of a low pressure compressor 2 which exhausts serially into a high pressure compressor 6), two systems which provide propulsion; that is, an internal propulsion system comprising a combustion chamber 10 and at least one turbine 4 or 8 and an internal nozzle which, with the joint compression system, constitute the internal propulsion system, and an external propulsion system comprising a system 13a, 15 for acquiring a significant fraction of the air exhausted by the joint compressor (for instance. 25% more), a combustion chamber 17 and at least one turbine 18 which drives a blower 20, the flow of air from which is mixed with the flow of hot gases from turbine 18 and is ejected through an external nozzle, which shall be subsequently described.

According to one of the advantageous characteristics of this invention, nozzle 24 of the internal propulsion system and nozzle 25 of the external propulsion system are of variable geometry. In the present embodiment, each of the two nozzles comprises two sets of flaps 24a and 24b or 25a and 25b.

The flaps of the first set 24a and 25a. are hinged at their front ends at 24c or 25c, respectively at the front end of envelope 1 which constitutes the internal wall of annular conduit 21 and on the interior of exterior envelope 1 of the engine pod. The flaps of the second set 24b or 25b are hinged at their front ends at 24d or 25d, respectively on the back end of the flaps of the first set 24a or 25a. The back ends 24d and 25d of the flaps of the first set are connected by appropriate linkages to mechanisms providing, on the one hand, for synchronization of each set of flaps, and, on the other hand, for the movement of each nozzle from its convergent-divergent position, shown on the top portion of FIG. 1 and called the "closed neck" position, to the so-called "open neck" position shown at the bottom half of FIG. 1. As a result, the two sets of flaps of one nozzle may be substantially tangent to a cone convergent toward the rear, as shown in solid lines for the internal nozzle in the bottom portion of the same FIG. 1, and for the external nozzle in dotted lines on said bottom portion of FIG. 1. It is understood that the appropriate linkages mentioned above may be connected to the front flaps 24a, 14b or to the rear flaps 24b, 25b, preferably near their common hinge points. It should additionally be noted, particularly for internal nozzle 24, that, primarily for simplifying control, the "open neck" position does not have to be continuously convergent toward the rear, though it should approach this configuration, and that there may thus be a slightly divergent rear part. In a preferred embodiment, behind "variable neck" nozzle 25 there may be provided conventional mechanisms to vary the exhaust section of said nozzle 25. For instance, there may be an exhaust section adjustment nozzle comprising two flaps 29 providing, at a partial deflection position, for the supply of air acquired from the exterior to the exhaust section to reduce the housing drag at subsonic speeds, and at a full deflection position for inversion of the direction of the two jets so as to provide a braking mechanism to the aircraft equipped with the propulsion engine according to the invention.

Nozzles with variable geometry (neck variation) and with deflector flaps are well known in the art, as are the mechanisms required to enable them to move from one configuration to another, so that it is not necessary to describe these elements in detail.

FIGS. 2 through 4 are highly schematic representations of the main components of the propulsion engine shown in FIG. 1. Given the highly reduced scales of FIGS. 2 through 4, it was additionally possible to schematically illustrate completely elements which, in conjunction with the propulsion engine according to the invention, provide an optimal "propulsion unit" (comprising the propulsion engine and its nacelle) for supersonic aircraft, and more particularly for a commercial supersonic jet. This relates more particularly to peripheral ports or lateral apertures 26 which may be obstructed by a sliding coupling 26a, and which are designed to supply the blower 20 with atmospheric air when the ports 26 are in the completely open position, as shown on the bottom portion of FIG. 1 and on FIGS. 2 and 3, or only partially open, as shown on FIG. 4. Also schematically shown is a supersonic air intake of a conventional type, comprising one or more ramps 34 on which supersonic compression is produced through a series of oblique shocks, with a high compression efficiency. The ramp 34 includes a movable portion 34a, as well as one or more outer layer traps 27 designed to stabilize a frontal shock in front of a subsonic diffuser 35, defined by panels 36 which are pivotable around axes 36a. Also illustrated are mechanisms such as flaps 28a and 28b, designed to direct the air aspirated by the outer layer trap 27 either toward the intake of blower 20 when flaps 28a are closed and flaps 28b are open (FIG. 4), or toward the exterior of the front part of the engine pod, that is, into the atmosphere when, conversely, flaps 28a are open and flaps 28b are closed (FIG. 3).

Referring to FIGS. 2 through 4, the various operating speeds of the propulsion engine and the propulsion unit corresponding to this first embodiment of the invention shall now be described.

At take-off, subsonic and transsonic ascent speed (bottom portion of FIG. 1 and FIG. 2), register 13a–b is completely open, so as to divert a maximum fraction of the compressed air arriving from the high pressure compressor 6 and to direct it toward combustion chamber 17 of the external propulsion system. As combustion chamber 17 is then supplied by a pre-regulated flow of fuel ignition occurs and the flow of heated gases which issues from it drives turbine 18 and is discharged through elbow conduit 22 into annular conduit 21 (FIG. 1). The turbine 18 rotates the blower 20 which is supplied with atmospheric air by the peripheral ports or side apertures 26, with coupling 26a turned to the fully open position. Ramps 34 and panels 36 are positioned in such a way as to leave the intake of the principal flow path as open as possible and flaps 28a and 28b are, conversely closed. The internal nozzle 24a–24b is in the open position, whereas the neck of external nozzle 25a–25b is "closed". The terminal flaps or lids 29 are fairly substantially turned toward a convergent position, and because of this, they admit air from the exterior according to arrow 29a. It is at this flight speed that they are turned to the maximum direct jet position. The air issuing from blower 20 is mixed with the turbine 18 exhaust gases in the annular conduit 21. The mixture can advantageously be accelerated by a mixer 30, for instance of the "daisy" type (also see FIG. 1). This mixture of still-hot gases, which constitutes the external jet flow, rejoins, through the annular space defined between the rear edges of flaps 24b of the internal nozzle, on the one hand, and envelope 1 or flaps 25a of the external nozzle, on the other hand, the internal flow of higher-temperature gas, which is exhausted from the low pressure turbine 4 of the internal propulsion system. The internal flow and external flow are simultaneously ejected through nozzle 25. Of course, at least during take-off per se, the flows of fuels which supply combustion chambers 10 and 17 are adjusted in such a way that the propulsion engine produces the thrust required to meet safety regulations for take-off.

However, as previously indicated, the total output of gas mixture ejected, which corresponds to the sum of the internal flow and the external flow, may be very high without the gas ejection rate reaching an excessively high value, which would generate an unacceptable noise level during take-off and the initial ascending phase. It should be noted that the diversion of a substantial fraction of the output of the compressor of the internal propulsion system would produce, at an equal temperature in front of the turbine, a reduction of speed of turbines 8 and 4 since there would be less energy in gas mass which is smaller, for instance by 25%, with the same intake temperature into the turbine. The result would be a reduction of the speed of the compression system, and thus a reduction of the internal flow. To avoid this reduction in output, which would translate into a reduction of thrust of the internal propulsion system, the flow of fuel supplying combustion chamber 10 of the internal propulsion system may be increased in such a way as to increase the temperature of the heated gases which pass through the turbines. Such a temperature increase in front of turbine 8 would, during take-off, restore the temperature which will exist in front of the turbine at cruising speed, for a Mach number on the order of 2, and for optimum operation of the compression system corresponding to a constant value of the $N/\sqrt{T_e}$ relationship, wherein N is the rotation speed of the compression system and $T_e$ is the temperature of the air that enters thereinto. Of course, the flow of fuel into combustion chamber 17 of the external propulsion system may also be adjusted to obtain the maximum possible total thrust of the propulsion engine under take-off conditions, while maintaining noise at an acceptable level.

As indicated above, in the case where the propulsion engine according to the invention is designed for a cruising speed of approximately Mach 2, a diversion percentage on the order of 25% may be anticipated. This percentage corresponds approximately to maintaining the value of the temperature in front of turbine 8 under take-off and cruising speed conditions for an operation corresponding to a constant value of the $N/\sqrt{T_e}$ relationship. Of course, the diversion percentage is preferably increased if the Mach number determined for cruising speed is higher. As an example, the relationship of the diversion percentage to the total flow of the compressor, for a single flow turbojet internal propulsion system may approach or equal the following relationship:

Total temperature to Mach cruising number -(INA temperature on ground / temperature to Mach cruising number).

Moving from the previous speed to the speed at ascent and acceleration below the supersonic range is accomplished by reducing the opening of register 13a–b, for instance by moving coupling 13b (using jacks 14) toward the right on FIG. 1, from the previous completely open position, and by progressively reducing the deflection of flaps 29. This operating speed will, for instance, enable the aircraft propelled by the engine according to this invention to move from about Mach 1.2 to about Mach 1.5.

In ascent and acceleration speed in the supersonic range (FIG. 3), ramps 34 and panels 36 are deflected in such a way as to improve the efficiency of air intake in that flaps 28a are open, while flaps 28b remain closed, so that the air intake at the outer layer trap 27 is directed toward the exterior of the front part of the engine pod; that is, it is sent back into the atmosphere around the front part of said engine pod. This is due to the fact that at relatively high Mach numbers, it is necessary to aspirate the outer layer of the air jet which enters the engine. However, in the embodiment shown in FIG. 3, since supplying blower 20 requires maintaining apertures 26 in a completely open position and, subsequently, the position of flaps 28b in a completely closed position, the air thus aspirated must necessarily be exhausted outside the engine pod, through the opening of flaps 28a. In addition, flaps 29 are in the open position where they extend the divergence formed by flaps 25b.

Final acceleration speed (FIG. 4) is a transitional phase corresponding to values of the Mach number on the order of 1.7 to 1.9, wherein there is a progressive reduction of the magnitude of the external flow relative to that of the internal flow there, register 13a–b remains partially open, but coupling 26a is moved toward the closed position in such a way as to produce a partial, progressive reduction of the intake sections of the lateral apertures 26, resulting in a decrease of output corresponding to the external flow. On the other hand, flaps 24a are closed, while flaps 28b are open to a fairly high degree, so that the air aspirated at the level of the outer layer trap 27, instead of being exhausted back into the atmosphere at the level of flaps 28a, is directed toward the intake of blower 20, in parallel with the air flow penetrating through apertures 26, which are partially open. On the other hand, the external combustion chamber 18 is no longer supplied with fuel, so that annular conduit 21 (FIG. 1) is traversed only by an air current at a relatively low temperature.

Finally, the internal nozzle 24a–24b is moved to the "closed neck" position, which is the position in which the external nozzle 25a–25b is maintained closed, while flaps 29 of course remain in the completely open position. These configurations display the advantage of avoiding the significant reduction of thrust which would result from a sudden and complete cessation of the external flow issuing from annular channel 21.

Supersonic cruising speed (see top portion of FIG. 1) is the speed set for Mach number values of at least 1.9. To reach this speed from the previously described speed, it suffices to completely close lateral apertures 26 using coupling 26a and to completely open flaps 28b, while flaps 28a remain closed. In addition, register 13a–b is completely closed, while combustion chamber 17 continues to be deprived of all fuel flow. External turbine 18 ceases to be activated and to drive blower 20. However, the latter is automatically rotated at relatively low speed by the air aspirated at the level of the outer layer trap 27, because of the fact that flaps 28b are completely opened. The blower, which provides vacuum drive to external turbine 18 through shaft 19, therefore sends through annular conduit 21 an air current which is almost at the same temperature as the outside air, which provides a cooling effect on the heated parts of the internal propulsion system. This cold air current, which passes through the gap between the external and internal nozzles, both of which have "closed" necks, is ejected through said external nozzle at the same time as the internal flow of hot gas, said external nozzle 25a–25b thus acting as a "recovery neck". Flaps 29 of course remain in the completely closed position, as in FIGS. 3 and 4.

Subsonic cruising speeds for overflight and approach are employed both for economical flight at subsonic speeds and landing approach periods, during rerouting, etc. In all of these cases, the propulsion engine according to this invention is controlled in such a way as to reduce its thrust at approximately 50 to 60% of its maximum thrust, particularly by a reduction of the flow of fuel in the external propulsion system. The various engine adjustment elements are then placed in the same positions as for the take-off speed (FIG. 2), except that the external nozzle 25a–25b is moved to a partially open position, and not to its "closed" neck position. Register 13a–b in particular is kept in the completely open position, so that there is simultaneously produced an internal flow at a temperature similar to that of the take-off and cruising speeds, and an external flow at a lower temperature.

FIGS. 5, 6, 7 and 8, which are schematic representations of another embodiment of this invention, respectively correspond to FIGS. 1, 2, 3 and 4 described above. The same symbols and references are employed on FIGS. 5 through 8 as in FIGS. 1 through 4, to represent or designate the same parts, or parts having equivalent functions. The major difference between this second embodiment and the first embodiment of this invention described above lies in the fact that the partial or total closing of apertures 26 is produced not by a sliding coupling, but by flaps 26b or other equivalent mechanisms, such as panels which open. These mechanisms may be distributed around the nacelle or, conversely, be provided only on the sides, particularly if, in this area, the shape of the nacelle is approximately rectangular. In the position shown on the top portion of FIG. 5, apertures 26 are completely closed by flaps 26b.

Figure 5:
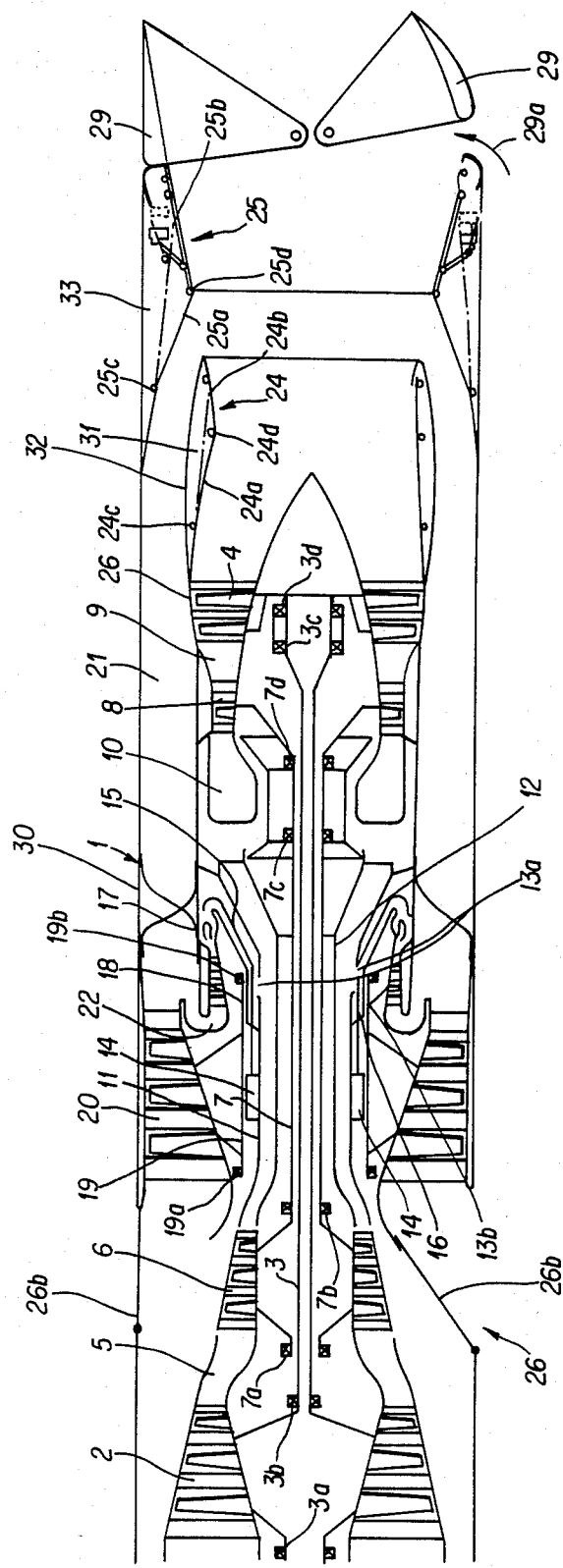
FIG. 5 is a drawing similar to that of FIG. 1, but of a second embodiment.

In the position shown on the bottom portion of FIG. 5 and on FIGS. 6 and 7, apertures 26 are, conversely, completely open.

FIG. 8 corresponds to the final acceleration speed (particularly for Mach numbers on the order of 1.7 to 1.9). As stated above, in this phase, the blower must be partially supplied (therefore apertures 26 must be partially opened by flaps 26b, which must therefore be moved to an intermediate position). However, the outer layer trap 27 must additionally be open. In the diagram of FIG. 8, this outer layer trap exhausts into blower 20, passing through the partial opening of flaps 26b (this is possible because, during final acceleration, flaps 26b are only partially open). In this second embodiment, flaps 28b of the first embodiment may be eliminated. On the other hand, in a still further embodiment, flaps 28b may be retained, particularly in order to provide greater flexibility of adaptation to the final acceleration speed, by optimizing the distribution of the flows which traverse blower 20 and which originate in part from the flows of the partially open lateral apertures and in part from the flows of the outer layer trap 27. For the lateral openings, flaps such as 28b may be provided at the upper part and at the lower part of the nacelle. These flaps may be controlled independently from the position of flaps 26b.

In a variation which is also not shown, the lateral (or evenly distributed) flaps 26b may be replaced by a series of flaps which pivot around axes perpendicular to the axis of the jet, and positioned so as to be successively staggered along the fuselage, wherein these flaps may assume continuously changing positions ranging from the position where they completely close apertures 26 to a position of opening obliquely toward the blower 20. Their design and implementation may be similar to that of the system for protection from sun known under the name of "Venetian blinds".

Of course, in the latter case, the "Venetian blind" type flaps may be articulated around axes located on their leading edges, that is, on their front extremities. In this case, when the apertures are opened or partially opened by such flaps, their leading edges do no overlap on the outside of the surface of the nacelle, neither at the front or at the rear. In a further variation, the axes of articulation of these flaps may be located behind their leading edges; in the latter case, the front edges of the flaps more or less form scoops on the outside of the nacelle, depending on the distance of their axes from their leading edges.

As those skilled in the art will easily comprehend, the operating speeds of this second embodiment, which correspond to speeds of take-off, subsonic and transsonic ascent, ascent and acceleration in the final acceleration in the supersonic range, supersonic cruising, and subsonic cruising speed, may easily be deduced from the operating speeds of the first embodiment, which were described previously, but by referring, respectively, to FIGS. 5, 6, 7 and 8 rather than to FIGS. 1, 2, 3 and 4.

This invention is not limited to the embodiments previously illustrated and described. It encompasses many other variations. The embodiments of FIGS. 1 through 5 may themselves be employed under conditions different from those previously indicated for the various flight speeds of a supersonic aircraft.

Among variations of the embodiments, the following may be cited as non-limiting examples: The internal propulsion system may be a single spool, single flow, or a single or dual spool dual flow, or a dual spool single flow turbine as shown in the drawing. The high-pressure turbine 8 of the internal propulsion system may comprise two stages in series with each other, the respective rotors of which are separated by a fixed distributor. A rectifier grill, which is also fixed, may be interposed between the last stage of the low-pressure turbine and the intake of the internal nozzle. Turbine 18 of the external propulsion system may also comprise several stages and be, for instance, advantageously embodied with superimposed blades, in such a way as to obtain two stages on a single disk. In this latter embodiment, the elbow conduit designated as 22 on FIG. 1, in the case of a two-stage turbine, is positioned so that its intake is across from the exhaust of the first stage, while instead of exhausting directly into annular conduit 21, its own exhaust emerges at the intake of the second stage, and it is the exhaust of the latter which directly emerges into annular conduit 21. In the case of a turbine comprising more than two stages, the elbow conduit designated as 22 may be positioned across from the exhaust of one stage, while its exhaust may be positioned at the intake of the following stage. In this case, elbow conduit 22 comprises fins to provide for the hot gas current the peripheral incline required for intake into the next working stage of the turbine. In fact, this is an elbow distributor. In the embodiments shown in FIGS. 1 and 5, which do not comprise superimposed turbine blades, elbow 22 also acts as a rectifier so that the gas flow is essentially longitudinal to the intake of channel 21.

For the internal nozzle 24a–24b there may be provided a system for fully automatic operation by the gases which traverse it, with no control device, or an "all or none" control system comprising the supply of the interior cavity 31 of said nozzle by intakes of air or gas at various pressures. Indeed, in the case of a convergent-divergent nozzle with variable geometry and winding up at super-critical speed, wherein the flow speed increases continuously in its convergence up to the speed of sound, then continues to increase beyond this speed in its divergence, the pressure exerted on the surfaces of the divergence flaps turned toward the axis of the propulsion engine is, at any point, lower than the pressure exerted in pocket 31 between the flaps 24a and 24b and their exterior fairing 32, as long as this pocket is supplied by an internal pressure intake judiciously positioned in front of the divergence flaps, for instance at neck 24d. The pressure exerted on the surfaces of the convergence flaps turned toward the axis of the propulsion engine is, at any point, higher than the pressure exerted in pocket 31. The divergence flaps are therefore subject to pressure directed toward the inside, and the convergence flaps are subjected to pressures directed toward the exterior. The pressures exerted on the divergence flaps 24b are therefore more powerful, as long as said flaps 24b are of sufficient length relative to the convergent flaps 24a, thus ensuring, at cruising speed and speeds corresponding to the top of the supersonic range, a "closed neck" position as stated previously.

In case of nozzle operation at subcritical speed, for which the speed of the flow increases in the convergence while remaining lower than the speed of sound, then decreases in the divergence, the pressure exerted on the internal surfaces of both the convergent flaps and the divergent flaps is higher than the pressure exerted in pocket 31. The flaps are therefore subjected to pressures directed toward the exterior, ensuring the "open neck" position at speeds of take-off, ascent and acceleration, and subsonic cruising.

The "open neck" and "closed neck" positions may, in a preferred embodiment, be defined by stops.

For shorter lengths of flaps 24b, semi-automatic (without jacks) operating controls may be provided. The closing of the pressure intake which connects pocket 31 with the channel, and the supply of said pocket 31 by automatic or controlled connection with a lower pressure enclosure, for instance by a channel (not shown) which traverses channel 21 and emerges outside the nacelle, conversely result, on the assembly of flaps 24a and 24b, in pressures directed toward the exterior which enable an "open neck" position to be obtained for speeds of take-off, subsonic ascent, lower supersonic range, and subsonic cruising (particularly for waiting periods and re-routing), as stated previously.

In certain cases, it is therefore possible to eliminate the control jacks, and in other cases, it is possible to use only low-power control jacks which act primarily as shock absorbers. This is particularly advantageous insofar as it provides for reducing the magnitude of the obstacles positioned in the flow channel. Finally, it is appropriate to note that adjusting the position of collar 24d to the desired position may be particularly simple, since an "all or none" system with no intermediate position nor continuous variation is normally satisfactory.

As for the external nozzle, it can advantageously be controlled by continuously adjusting the pressure inside the "pocket" 33 formed between convergence 25a, divergence 25b and the external fairing 1. For this purpose, a conventional strap system may be employed to provide for adjusting air leaks front and rear in such a way that the tapered section of the nozzle automatically adjusts to the desired size.

Another embodiment which is not described but would fall within the scope of the invention would comprise jointly supplying blower 20, when the external propulsion system is in operation, with part of the air which traverses it originating from the primary intake sleeve, particularly through the outer layer trap 27, for instance by differential rotation of ramps 34 and panels 36. Of course, during operation at supersonic cruising speed, lateral apertures 26 must remain closed as in the preceding examples, since during automatic rotation the blower is supplied only by the limiting layer trap of the sleeve. In this embodiment, flaps 28a and 28b may be eliminated.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A supersonic aircraft propulsion engine comprising:
at least one compressor rotatable about an engine axis;
a variable geometry internal nozzle coaxial with said compressor;
an internal envelope defining an internal gas flow path connecting said compressor and said nozzle, said internal envelope further defining a radially tapered portion;
at least one internal turbine rotatably fixed to said at least one compressor and positioned in said internal flow path;
an internal combustion chamber in said internal flow path and positioned between said tapered portion and said internal turbine, said compressor, internal nozzle, internal flow path, internal turbine and internal combustion chamber defining an internal propulsion system;
an external propulsion system at least partially concentrically positioned on the outside of said radially tapered portion, said external propulsion system comprising means for diverting any adjustable fraction of gas from said internal flow path to an external flow path whereby no external compressor is required, at least one external combustion chamber in said external flow path, at least one external turbine downstream from said external combustion chamber in said external flow path, a blower rotatably driven by said external turbine, and an external variable geometry nozzle downstream from said external turbine and said blower in said external flow path, said external nozzle being concentrically radially outside of, and downstream from, said internal nozzle; and
an external engine pod coaxial with, and radially surrounding said internal and external propulsion systems, said pod and internal envelope together defining an external annular conduit forming that portion of said external flow path between a confluence from said external turbine and blower at one end, and said external nozzle at a second end, said external turbine and blower both providing flow into said annular conduit.

2. The engine of claim 1 wherein said means for diverting comprise at least one aperture in said radially tapered portion, at least one movable register for closing said aperture and register drive means for moving said register between positions which open and close said aperture.

3. The engine of claims 1 or 2 wherein that portion of said external flow path between said external turbine and said confluence comprises an elbow conduit.

4. The engine of claims 1 or 2 including lateral apertures in said pod upstream from said blower for providing atmospheric air to said blower, and further including means for selectively closing said lateral apertures.

5. The engine of claim 4 wherein said means for closing said lateral apertures comprise an axially sliding coupling.

6. The engine of claim 4 wherein said means for closing said lateral apertures comprise at least one pivoting flap.

7. The engine of claim 1 wherein said internal flow path includes an intake upstream from said compressor, and said external flow path includes a blower intake, further comprising flap means in said internal flow path intake for selectively directing air to one of said blower intake and the exterior of said pod.

8. The engine of claim 1 including a mixer in said annular conduit.

9. The engine of claim 1 wherein said internal nozzle is constructed to assume one of an open large diameter configuration and a closed small diameter configuration, said internal nozzle including a closed pocket communicating with a source of gas, wherein the configuration of said internal nozzle is determined by the pressure of said gas in said pocket.

10. The engine of claim 1 wherein said external nozzle comprises axially front and back flaps and a closed pocket communicating with a source of gas, said external nozzle being constructed to assume one of an open large diameter configuration wherein said front and back flaps are aligned and converging towards the rear of the nozzle, and a closed small diameter position, wherein the configuration of said external nozzle is determined by the pressure of said gas in said pocket acting on said front and back flaps.

11. The engine of claim 1 including an exhaust section adjustment nozzle connected to an ambient air intake downstream from said external nozzle.

12. The engine of claim 1 wherein said at least one external combustion chamber is positioned in said external flow path at a position for directly receiving gas from said internal flow path without the intermediary of a compressor, wherein said blower is positioned in said external flow path such that air from said blower does not pass through said at least one external combustion chamber, and wherein said blower and said at least one external combustion chamber are mutually positioned such that a flow of air from said blower converges with a flow of gas from said at least one external combustion chamber at said confluence.

* * * * *